United States Patent
Hallmans et al.

(10) Patent No.: US 11,532,940 B2
(45) Date of Patent: Dec. 20, 2022

(54) COMMUNICATION IN A CONVERTER DEVICE

(71) Applicant: Hitachi Energy Switzerland AG, Baden (CH)

(72) Inventors: Daniel Hallmans, Ludvika (SE); Jimmy Ohman, Ludvika (SE); Johan Österberg, Borlänge (SE); Joakim Tolfmans, Falun (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 144 days.

(21) Appl. No.: 16/801,299

(22) Filed: Feb. 26, 2020

(65) Prior Publication Data

US 2020/0274463 A1  Aug. 27, 2020

(30) Foreign Application Priority Data

Feb. 26, 2019 (EP) .................................... 19159285

(51) Int. Cl.
*H02J 3/40* (2006.01)
*H02M 7/797* (2006.01)
(Continued)

(52) U.S. Cl.
CPC ............ *H02J 3/40* (2013.01); *H02M 7/483* (2013.01); *H02M 7/4835* (2021.05); *H02M 7/797* (2013.01); *H04B 10/27* (2013.01)

(58) Field of Classification Search
CPC ............ H02M 7/797; H02M 7/4835; H02M 1/0025; H02M 7/483; H02M 1/0845;
(Continued)

(56) References Cited

U.S. PATENT DOCUMENTS 6,185,216 B1 * 2/2001 Chapman .............. H04J 3/0647
370/402
6,707,828 B1 * 3/2004 Wolf ...................... H04J 3/0641
370/503
(Continued)

FOREIGN PATENT DOCUMENTS

CN  102754369 A  10/2012
CN  103067149 A   4/2013
(Continued)

OTHER PUBLICATIONS

Received STIC search report from EIC 2800 searcher Steve Chung, Chickasaw for claim 1 dated May 17, 2021. (Year: 2021).*

(Continued)

*Primary Examiner* — Emily P Pham
*Assistant Examiner* — Htet Z Kyaw
(74) *Attorney, Agent, or Firm* — Slater Matsil, LLP

(57) ABSTRACT

A method can be used to synchronize time between nodes of a converter device for high voltage power conversion. The method is performed in a first node of the converter device and includes receiving a time reference from a second node of the converter device, obtaining a delay value for receiving time references from the second node, determining a compensated time by adding the delay value to the time reference, and setting a clock in the first node to be the compensated time.

12 Claims, 5 Drawing Sheets

(51) Int. Cl.
*H04B 10/27* (2013.01)
*H02M 7/483* (2007.01)

(58) Field of Classification Search
CPC ...... H02M 1/088; H02M 7/487; H04B 10/27; H02J 3/40; H04J 3/0638
See application file for complete search history.

(56) References Cited

U.S. PATENT DOCUMENTS

| | | | | |
|---|---|---|---|---|
| 7,103,124 | B1* | 9/2006 | Lindskog | H04J 3/0667 375/354 |
| 8,817,503 | B2* | 8/2014 | Inoue | H02M 7/12 363/68 |
| 9,106,353 | B2* | 8/2015 | Hsueh | H04L 63/0428 |
| 9,774,206 | B2* | 9/2017 | Kim | H02J 7/007 |
| 9,831,758 | B2* | 11/2017 | Wien | H04L 12/4637 |
| 10,911,211 | B1* | 2/2021 | Kratz | H04J 3/0667 |
| 11,303,376 | B2* | 4/2022 | Oe | H04J 3/0682 |
| 2003/0137856 | A1* | 7/2003 | Sheng | H02J 1/102 363/72 |
| 2007/0040657 | A1* | 2/2007 | Fosler | H03M 1/363 340/333 |
| 2009/0086764 | A1* | 4/2009 | Lee | H04J 3/0667 370/503 |
| 2010/0103781 | A1* | 4/2010 | Rai | G06F 1/12 368/55 |
| 2010/0157975 | A1* | 6/2010 | In | H04J 3/0682 370/350 |
| 2011/0267854 | A1* | 11/2011 | Flannery | H04L 12/437 363/72 |
| 2012/0320902 | A1 | 12/2012 | Na et al. | |
| 2013/0157593 | A1* | 6/2013 | Achanta | H04J 3/0638 455/84 |
| 2013/0197705 | A1* | 8/2013 | Ray | H02J 3/241 700/295 |
| 2013/0227172 | A1* | 8/2013 | Zheng | H04J 3/0667 709/248 |
| 2014/0010244 | A1* | 1/2014 | Bui | H04J 3/0697 370/503 |
| 2014/0119080 | A1 | 5/2014 | Sakamoto et al. | |
| 2015/0015072 | A1* | 1/2015 | Deboy | H02M 7/48 307/52 |
| 2015/0071309 | A1* | 3/2015 | Aweya | H04J 3/0664 370/503 |
| 2015/0229229 | A1 | 8/2015 | Häfner et al. | |
| 2015/0302441 | A1* | 10/2015 | Katsuyama | G06Q 30/0206 705/36 R |
| 2016/0127118 | A1 | 5/2016 | Yun et al. | |
| 2017/0150464 | A1* | 5/2017 | Kazehaya | H04J 3/0673 |
| 2018/0109202 | A1* | 4/2018 | Marquardt | H02J 7/0024 |
| 2018/0132199 | A1* | 5/2018 | Zhang | H04W 56/0065 |
| 2019/0356466 | A1* | 11/2019 | Kratz | H04J 3/0682 |
| 2022/0024323 | A1* | 1/2022 | Kresse, III | B60W 10/26 |

FOREIGN PATENT DOCUMENTS

| | | |
|---|---|---|
| CN | 103188064 A | 7/2013 |
| EP | 2897268 A1 | 7/2015 |
| EP | 3016306 A1 | 5/2016 |
| GB | 2301991 A | 6/1995 |

OTHER PUBLICATIONS

Received STIC search report from EIC 2800 searcher Steve Chung, Chickasaw for claim 7 dated May 18, 2021. (Year: 2021).*

Received STIC search report from EIC 2800 searcher Salim Alam dated May 18, 2021. (Year: 2021).*

Toh, C. L., et al., "A High Speed Control Network Synchronization Jitter Evaluation for Embedded Monitoring and Control in Modular Multilevel Converter", 2013 IEEE Grenoble Conference, Grenoble, France, Jun. 16-20, 2013, 6 pages.

Wu, Xuepei, et al., "End-to-end Delay Evaluation of Industrial Automation Systems based on EtherCAT", 2017 IEEE 42nd Conference on Local Computer Networks (LCN), Singapore, Oct. 9-12, 2017, 8 pages.

Rietmann, Stefan, et al., "Field Bus for Data Exchange and Control of Modular Power Electronic Systems with High Synchronisation Accuracy", 2018 International Power Electronics Conference, Niigata, Japan, May 20-24, 2018, 8 pages.

Loh, P.C, et al., "Synchronisation of Distributed PWM Cascaded Multilevel Inverters with Minimal Harmonic Distortion and Common Mode Voltage", IEEE 34th Annual Conference on Power Electronics Specialist (PESC), Acapulco, Mexico, Jun. 15-19, 2003, 6 pages.

Rietmann et al., "Field Bus for Data Exchange and Control of Modular Power Electronic Systems With High Synchronisation Accuracy," The 2018 International Power Electronics Conference; May 20, 2018; pp. 2301-2308.

* cited by examiner

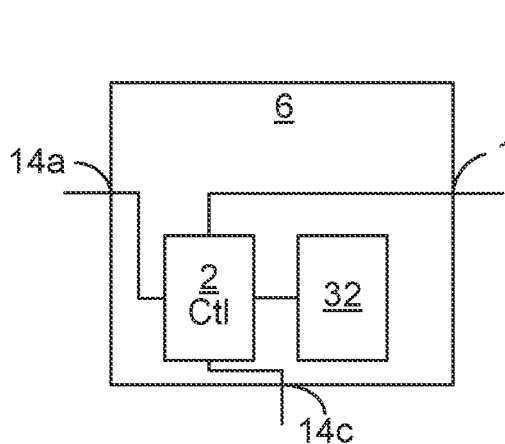
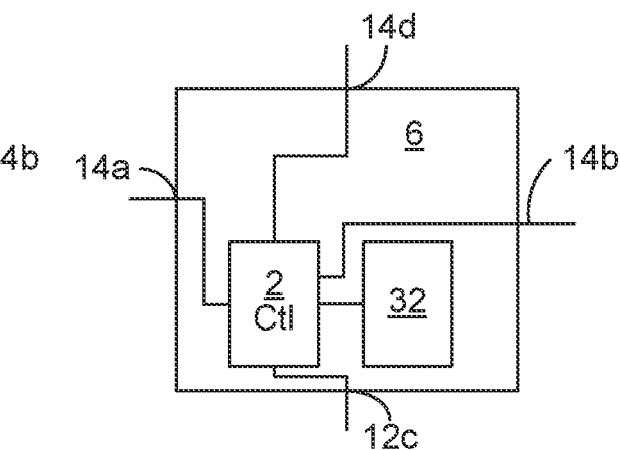
Fig. 4A       Fig. 4B
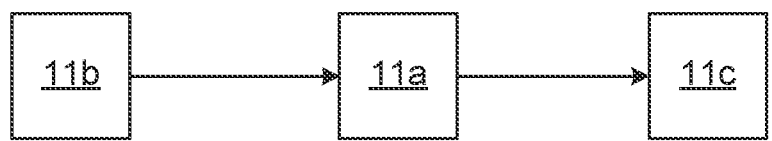
Fig. 5

COMMUNICATION IN A CONVERTER DEVICE

CROSS-REFERENCE TO RELATED APPLICATIONS

This application claims the benefit of European Patent Application No. 19159285.6, filed on Feb. 26, 2019, which application is hereby incorporated herein by reference.

TECHNICAL FIELD

The present disclosure relates to the field of converter devices and in particular embodiments to communication between different nodes in a converter device.

BACKGROUND

High Voltage Direct Current (HVDC) is increasing in usage due to a number of benefits compared to AC (Alternating Current) for power transmission. In order to connect a HVDC link or an HVDC grid to an AC grid, conversion needs to occur from DC (Direct Current) to AC or AC to DC. This conversion can, for example, be performed using a converter device such as a voltage source converter (VSC).

In such converter devices, converter cells are controlled by a main controller to synthesize the conversion. When there are many converter cells, each converter cell needs to be able to receive a signal from the main controller, which can get complicated when the number of converter cells is large. Moreover, time needs to be synchronized between different nodes of the converter device.

EP 2 897 268 A1 discloses a power electronic converter for converting electric energy and a method for controlling a power electronic converter. The converter comprises a plurality of PE (Power Electronic) switches, and a control system adapted to transmit control information to the PE switches. The control system comprises a master controller and a plurality of local controllers controlling the PE switches. The control system further comprises one or more slave devices controlled by the master controller. A control system is configured to provide time synchronization between the one or more slave devices and the local controllers. The delay of the control information through each slave device is estimated, and it is calculated for each slave device a new clock setting to be set.

However, the presented time synchronization is dependent on a known communication path to be able to estimate the delay from the control system to each slave device. When there are multiple redundant communication paths for signals, the presented time synchronization method is not applicable since the delay can vary depending on the communication path.

SUMMARY

Embodiments of the invention provide an improved time synchronization in a converter device which is applicable when multiple communication paths can be taken.

According to a first aspect, a method is used for synchronizing time between a plurality of nodes of a converter device for high voltage power conversion. The method is performed in a first node of the converter device and comprises the steps of receiving a time reference from a second node, obtaining a delay value for receiving time references from the second node, determining a compensated time by adding the delay value to the time reference, and setting a clock in the first node to be the compensated time.

The method may further comprise the step of sending the compensated time as a time reference to a third node.

The delay value may consider both a communication delay and a processing delay.

There may be a master clock source upon which a plurality of time references in the converter device is based.

All time references in the converter device may be based on the master clock source.

According to a second aspect, a first node can synchronize time between a plurality of nodes of a converter device for high voltage power conversion. The first node is one of the plurality of nodes. The first node comprises a processor and a memory storing instructions that, when executed by the processor, cause the first node to receive a time reference from a second node, obtain a delay value for receiving time references from the second node, determine a compensated time by adding the delay value to the time reference, and set a clock in the first node to be the compensated time.

The first node may further comprise the step of sending the compensated time as a time reference to a third node.

The delay value may consider both a communication delay and a processing delay.

There may be a master clock source upon which a plurality of time references in the converter device is based.

All time references in the converter device may be based on the master clock source.

According to a third aspect, a computer program is used for synchronizing time between a plurality of nodes of a converter device for high voltage power conversion, the plurality of nodes comprising a first node. The computer program comprises computer program code which, when run on the first node causes the first node to receive a time reference from a second node, obtain a delay value for receiving time references from the second node, determine a compensated time by adding the delay value to the time reference, and set a clock in the first node to be the compensated time.

According to a fourth aspect, a computer program product comprises a computer program according to the second aspect and a computer readable medium on which the computer program is stored.

According to a fifth aspect, a converter arm for power conversion comprises a plurality of converter cells. At least one of the converter cells comprises a plurality of semiconductor switches, an energy storage element and at least three signal connections arranged to control the conducting state of the plurality of semiconductor switches. At least one converter cell may be connected to receive a signal from at least three entities via the signal connections. At least two of the three entities are neighboring converter cells, and each converter cell is arranged to forward, as long as the signal has not been received before, a signal to all connected neighboring converter cells via the signal connections.

The converter arm may further comprise a shortcut connection between two non-neighboring converter cells wherein the non-neighboring converter cells each comprises at least four signal connections.

Each converter cell may be arranged to detect a blocking message supplied to the signal connections separately from other messages supplied to the signal connections, wherein the blocking message instructs the converter cell to turn off all semiconductor switches of the converter cell.

Each converter cell may be arranged to detect and forward the blocking message without fully decoding a signal comprising the blocking message.

Four of the converter cells may be directly connected to a main controller, arranged to generate signals arranged to control the conducting state of the plurality of semiconductor switches of the converter cells.

The converter cells directly connected to the main controller may be connected to only two neighboring converter cells, and any converter cells not directly connected to the main controller are connected to three neighboring converter cells.

Each converter cell may comprise a cell controller and the signal connections of each converter cell are connected to the cell controller, wherein the cell controller is arranged to control the semiconductor switches of the converter cell via respective gate units arranged to condition signals for the semiconductor switches to a suitable format.

Each converter cell may comprise an auxiliary power input, wherein each auxiliary power input is arranged to power control functions of the respective converter cell without charging the energy storage element of the respective converter cell.

The converter arm may further comprise at least one battery connected to the auxiliary power inputs of the converter cells.

Each converter cell may comprise a battery connected to its auxiliary power input.

Each one of the signal connections may be a bidirectional connection.

Each one of the signal connections may be arranged to communicate via optical connections.

According to a sixth aspect, a converter device for converting power in at least one direction between an alternating current and a direct current comprises at least one converter arm according to the fifth aspect.

The converter device may comprise a plurality of phase legs connected in parallel between terminals of a DC connection, and each phase leg comprises at least one converter arm according to the fifth aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIGS. 4A-B are schematic diagrams illustrating the structure of two embodiments of a converter cell of FIGS. 2A-B or FIG. 3;

FIG. 5 is a schematic diagram illustrating communication of time references between nodes of the converter device;

DETAILED DESCRIPTION OF ILLUSTRATIVE EMBODIMENTS

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
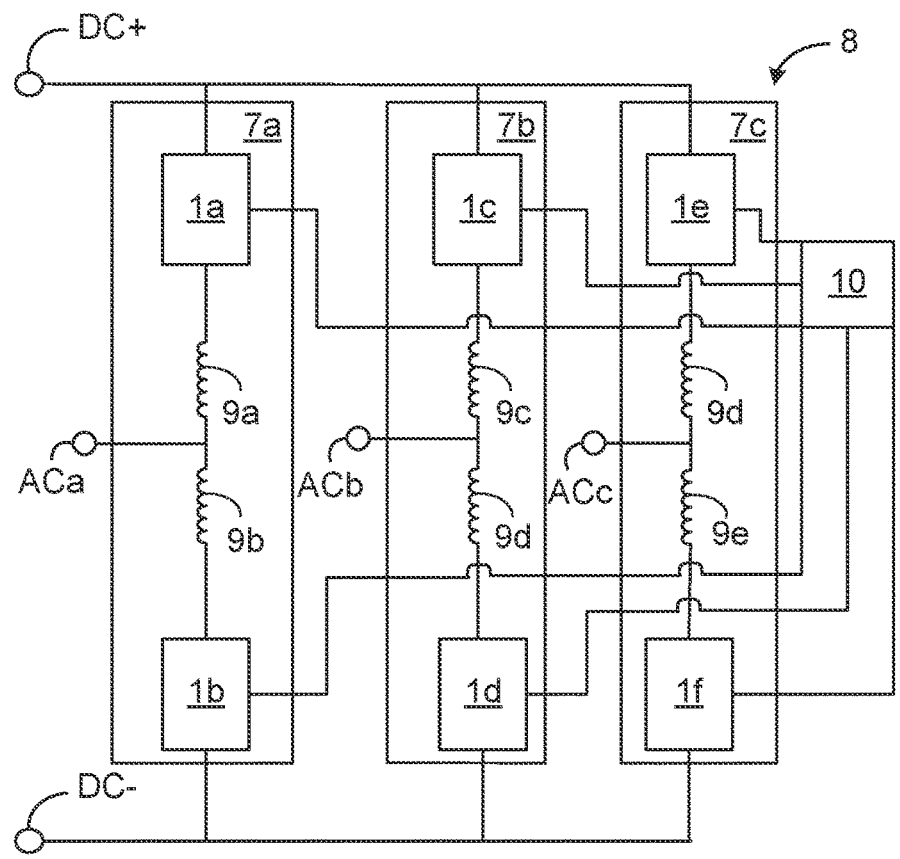
FIG. 1 is a schematic diagram illustrating one embodiment of a converter device for converting between DC and AC.

FIG. 1 is a schematic diagram illustrating one embodiment of a converter device 8 for converting between DC and AC. The DC connection comprises a positive terminal $DC^+$ and a negative terminal $D^-$ and can be an HVDC connection. The AC connection in this embodiment is a three phase connection comprising three AC connections $AC_a$, $AC_b$ and $AC_c$ and can be connected, e.g., to an AC grid. While the converter device 8 is here shown with three phases, the converter device 8 can equally well have one, two, four or more phases.

Since there are three phases here, there are three phase legs 7a-c. The three phase legs 7a-c are connected in parallel between terminals $DC^+$, $DC^-$ of the DC connection. In this embodiment, a first phase leg 7a comprises a first converter arm 1a, a first inductor 9a, a second inductor, 9b and a second converter arm 1b connected serially between the terminals $DC^+$, $DC^-$ of the DC connection. Analogously, a second phase leg 7b comprises a third converter arm 1c, a third inductor 9c, a fourth inductor, 9d and a fourth converter arm 1d connected serially between the terminals $DC^+$, $DC^-$ of the DC connection, and a third phase leg 7c comprises a fifth converter arm 1e, a fifth inductor 9e, a sixth inductor, 9f and a sixth converter arm 1f connected serially between the terminals $DC^+$, $DC^-$ of the DC connection. The AC terminals $AC_a$, $AC_b$ and $AC_c$ are provided between the inductors 9a-b of the respective phase legs 7a-c. Optionally, only one inductor is provided in each phase leg 7a-c.

A main controller 10 is connected to all converter arms 1a-f and sends signals to control the operation of the converter arms 1a-f. In this way, the main controller 10 controls the operation of the converter arms for conversion from AC to DC or from DC to AC. Additionally, the converter cells in the converter arms can send signals to the main controller 10, e.g., containing measurements, other operational data or any other suitable data. The converter device 8 can be unidirectional in either direction between AC and DC or bidirectional. The converter device 8 in this embodiment is a voltage source converter. One signal type that can be sent from the main controller 10 to one or more of the converter arms 1a-f is a blocking message.

While the converter device 8 is here shown with two converter arms for each phase leg, each phase could comprise any suitable number (1, 2, 3, etc.) of serially connected converter arms, controller by the main controller 10. In particular, if there are a large number of converter cells needed for a phase leg, the phase leg can comprise more than two converter arms.

Figure 2A:
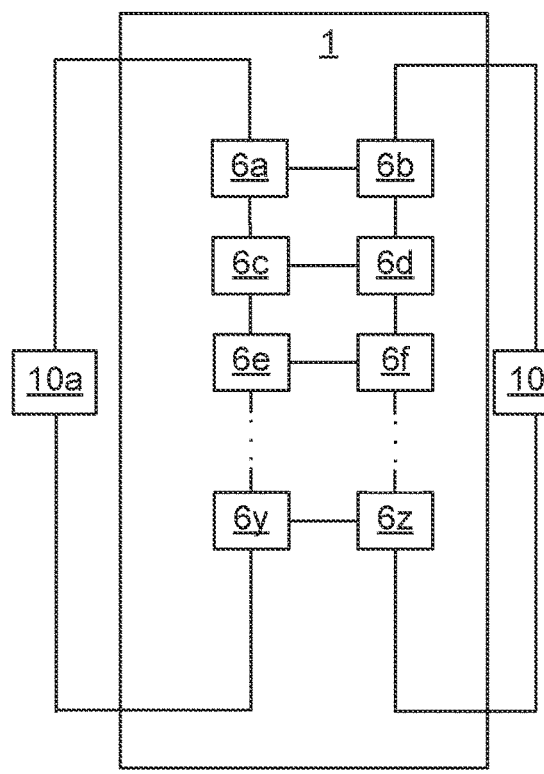
FIGS. 2A-B are schematic diagrams illustrating the structure of converter arms of the converter device of FIG. 1 according to two embodiments with varying connectivity options to the main controller.
Figure 2B:
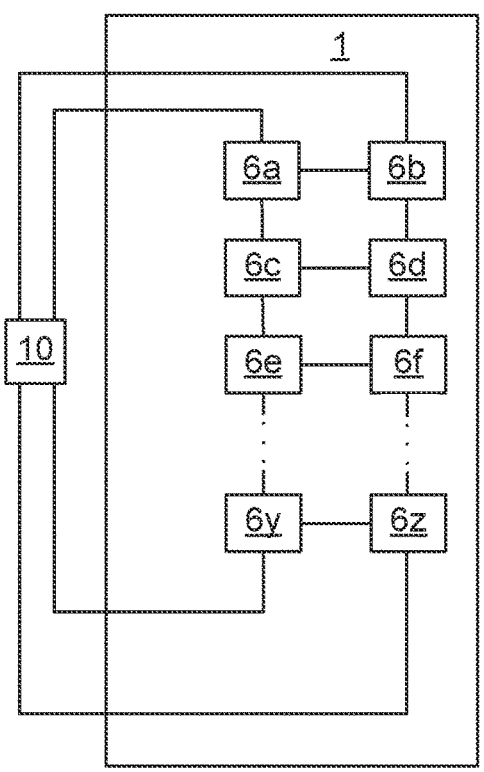

FIGS. 2A-B are schematic diagrams illustrating the structure of converter arms 1 of the converter device 8 of FIG. 1 according to two embodiments with varying connectivity options to one or more main controllers. The converter arm 1 can be any one of the converter arms 1a-f shown in FIG. 1. First, the structure of the converter arm shown in FIG. 2A will be described.

The converter arm 1 comprises a plurality of converter cells 6a-6z. Two converter cells 6a, 6y are connected to a first main controller 10a and two converter cells 6b, 6z are connected to a second main controller 10b. The two main controllers 10a-b are redundant and operate in the same way, with one main controller being active and one main controller being in hot standby. The main controller in hot standby is able to step in and quickly take over control if needed, e.g., due to a failing active main controller.

The number of converter cells in the converter arm can vary greatly from installation to installation and can, e.g., reach hundreds of converter cells. Each converter cell 6a-z comprises a switching cell with semiconductor switches and an energy storage element, as will be explained in more detail below. Furthermore, at least some of the converter cells 6a-z comprise at least three signal connections, where a signal provided on any one of the signal connections controls the conducting state of the semiconductor switches of the converter cell. The signal connections are bidirectional connections.

Each converter cell 6a-z is connected to receive a signal from either one of the neighboring entities. Neighboring is here to be interpreted as adjacent with a direct signal connection. For example, a first converter cell 6a has two neighboring converter cells: a second converter cell 6b and a third converter cell 6c. Moreover, the first converter cell 6a is directly connected to the first main controller boa.

As shown in FIG. 2A, at least two of the three entities for each converter cell are neighboring converter cells. See for example, converter cells 6a-b and 6y-z which are respectively connected to two neighboring converter cells and one of the main controllers 10a-b. Other converter cells are connected to three neighboring converter cells; see, e.g., converter cells 6c-f. More particularly, for instance the third converter cell 6c has three, and only three, neighboring converter cell: the first converter cell 6a, a fourth converter cell 6d and a fifth converter cell 6e.

Furthermore, each one of the converter cells 6a-z is arranged to forward a received signal to all connected neighboring converter cells (and the main controllers 10a-b, if connected to one of the signal connections). In other words, each converter cell 6a-z can forward signals originating a main controller destined for a converter cell and vice versa. Each converter cell is configured to perform this action of signal forwarding autonomously, without additional external control. This forwarding is only performed under the condition that the signal has not been received before. In order for this condition to be evaluated, an identity of each received signal is stored and when a signal is received, its identity is checked against the list of already received signals. The forwarding of the signal then only occurs if the most recently received signal has not been received before.

The determination of when the signal has been received before can occur in different ways. In one embodiment, a node identity of the originating node of the message is included in the message. This node identity is then stored by the first node, for the time to live period, and any signal with the same originating node is considered to be the same message, and thus considered to have been received before. After the time to live period expires, the node identity is removed or indicated to be inactive. In this embodiment, each signal does not need to have its own identity; it is sufficient that the originating node is included in the signal. Optionally, a certain indicator in a signal can reset the time-to-live time, i.e., make a specific entry of an originating node immediately inactive.

In one embodiment, each message has its own signal identity. This signal identity is then stored and any signal with the same signal identity is considered to be the same message.

By only forwarding signals which have not been received before, it is prevented that the same signal continues to be forwarded between nodes in the converter device which, in a worst case scenario, can create an endless loop of signal forwarding of the same signal. The risk for such a loop depends on the topology of nodes in the converter device.

In this way, a signal from the main controllers 10a-b floods the converter cells 6a-z of the converter arm with the signal. Significantly, this arrangement provides great redundancy and resistance to any faults which may affect one or more of the converter cells, even though the main controllers 10a-b only needs to be connected on two sides of the converter cells, with two converter cells connected to the main controllers 10a-b on either side. That is, four converter cells 6a-b, 6y-z are connected to the main controllers 10a-b.

Say, for example, that a first converter cell 6a fails and then another converter cell 6f fails. In systems of the prior art, a failure of two converter cells can affect the controllability of many other converter cells. In contrast, with this arrangement, two failed cells can never affect the controllability of any other cells. In fact, in most cases, three or more converter cells can fail without affecting the controllability of other cells. In the prior art, the only way to reach such resilience to errors is by providing a connection between each individual converter cell and a main controller, which is a costly solution if the number of converter cells is high.

In the structure of FIG. 2A, the redundant two main controllers 10a-b are directly connected to the converter arm 1, to four converter cells 6a-b, 6y-z.

The embodiment illustrated in FIG. 2B is similar to the embodiment illustrated in FIG. 2A. Here, however, there is a single main controller 10 with four individual connections from the main controller to the four connections to the connected converter cells 6a-b, 6y-z. This embodiment provides a simpler and less expensive solution compared to the embodiment of FIG. 2A.

Figure 3A:
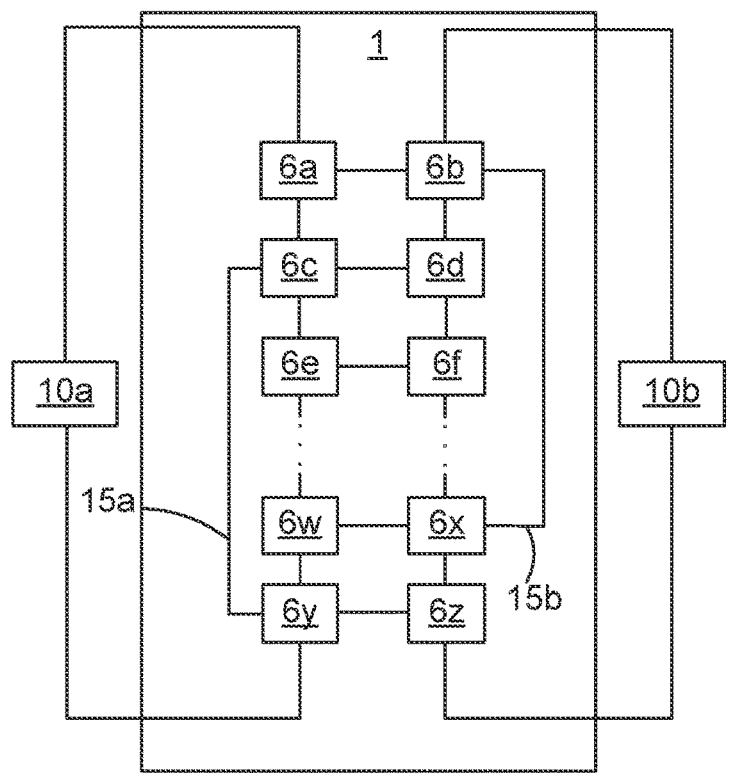
FIGS. 3A-B are schematic diagrams illustrating structures of a converter arm of the converter device of FIG. 1 according to two embodiments.
Figure 3B:
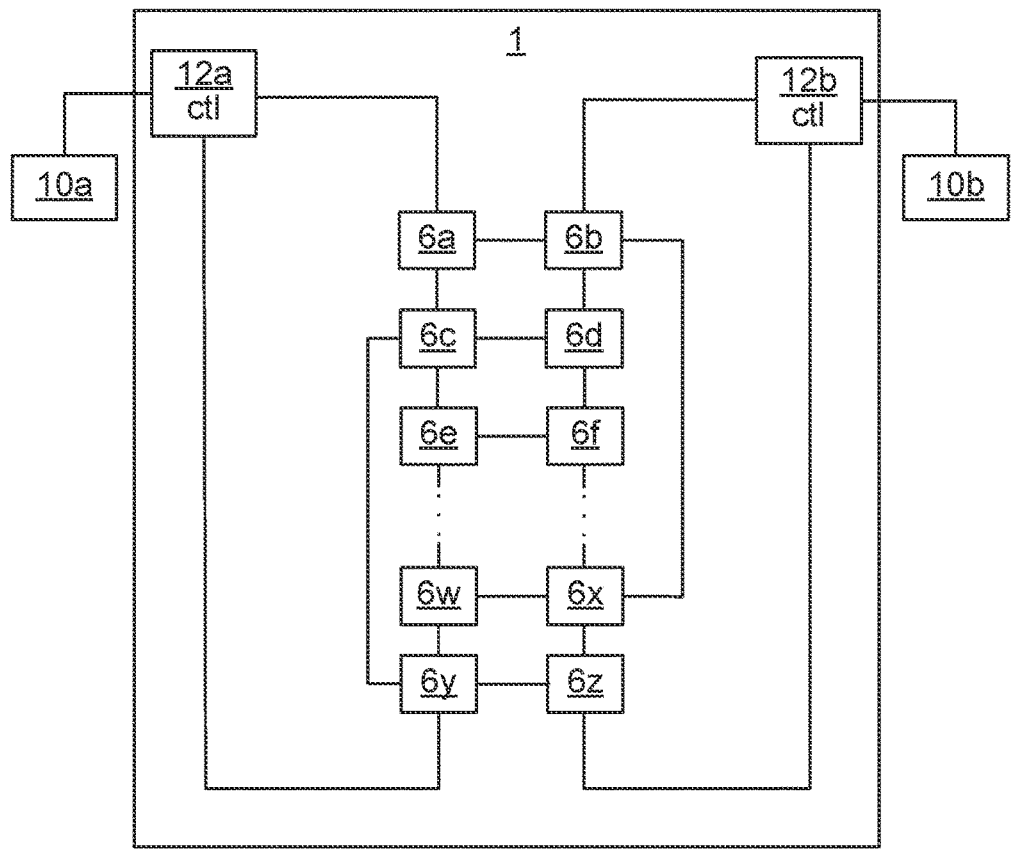

FIG. 3A-B are schematic diagrams illustrating structures of a converter arm of the converter device of FIG. 1 according to two embodiments. These embodiments are similar to the embodiment of FIGS. 2A-B, but also comprising shortcut connections 15a-b. First, the embodiment of FIG. 3A will be described.

A first shortcut connection 15a is provided between a first converter cell 6c and a second converter cell 6y. In order to make the shortcut connection 15a a shortcut, the first and second converter cells 6c,y are not neighboring converter cells.

Optionally, a second shortcut connection 15b is provided between a third converter cell 6b and a fourth converter cell 6x. Also here, in order to make the shortcut connection 15b a shortcut, the third and fourth converter cells 6b,x are not neighboring converter cells.

It is to be noted that shortcut connections can be placed between any two converter cells.

The converter cells connected to the shortcut connections 15a-b treat the signal connection just like any other of the signal connections and receive and/or forward signals on this input in the same way as for the other signal connections.

Using the shortcuts 15a-b, and since there is a small delay introduced for each time a signal passes through a control cell, the maximum delay for a signal to be propagated from one of the main controllers 10a-b to all converter cells is reduced. This can be particularly useful, e.g., for blocking messages. Optionally, more shortcut connections can be provided to further reduce the maximum delay for the signal propagation.

All converter cells connected to a shortcut connection 15a-b have an additional signal connection, and thus have (at least) four signal inputs.

Looking now to FIG. 3B, this is similar to the embodiment shown in FIG. 3A, but there are here two arm controllers 12a-b, which control switching in the converter arm 1, based on signals from the main controllers 10a-b. In this embodiment, there is redundancy in the main controllers 10a-b as well as the arm controllers 12a-b. The converter cells 6a-z are all controllable from either one of the main controllers 10a-b as well as either one of the arm controllers 12a-b. The arm controllers 12a-b could also be applied for other embodiments, such as those depicted in FIGS. 2A-B and described above, where the arm controllers would be provided between the main controller(s) and the converter cells.

FIGS. 4A-B are schematic diagrams illustrating the structure of two embodiments of a converter cell 6 of FIGS. 2A-B or FIGS. 3A-B. FIG. 4A shows one embodiment of a converter cell 6 that can be any one of the converter cells of FIGS. 2A-B and any one of the converter cells of FIGS. 3A-B which are not connected to a shortcut connection, i.e., a converter cell with three signal connections.

The converter cell 6 comprises a cell controller 2 and a switching cell 32. The cell controller 2 is connected to three signal connections 14a-c, to receive and/or forward signals to neighboring converter cells and/or a main controller, as described above. Each signal connection 14a-c can, for example, be configured to send and/or receive signals using an optical fiber, e.g., using EtherCAT, or any other suitable communication protocol.

When a signal is received on any one of the signal connections 14a-c, the cell controller 2 forwards the signal to the switching cell 32 and to all other signal connections (other than the signal connection over which the signal was received), as long as the signal has not been received before. In this way, any input signal is flooded to all signal connections.

FIG. 4B is illustrates another embodiment of a converter cell 6 that can be any one of the converter cells of FIGS. 3A-B which is connected to a shortcut connection, i.e., a converter cell with four signal connections. The converter cell 6 in this embodiment is similar to the controller cell in the embodiment of FIG. 4A. In this embodiment though, there are four signal connections 14a-d, to be able to accommodate also a signal connection over a shortcut connection.

FIG. 5 is a schematic diagram illustrating communication of time references between nodes of the converter device. Each one of the nodes 11a-c can be any node in the converter device 8 described above. For instance, the nodes can be any one of the converter cells, the arm controllers or the main controllers 10a-b.

In this figure, the perspective is from a first node 11a, which receives a time reference from a second node 11b. The first node 11a, in turn, supplies a time reference to a third node 11c, based on the received time reference. It is to be noted that the second node 11b and the third node 11c can act like the first node in another context.

The nodes 11a-c can be any nodes in the converter device. Examples of nodes are main controllers, arm controllers and converter cells. Time references can thus, e.g., be communicated from a main controller to an arm controller, from a main controller to a converter cell, from a main controller to another main controller, from an arm controller to a converter cell, and from a converter cell to a converter cell.

The time references mentioned here are transmitted using the signals described above.

Figure 6:
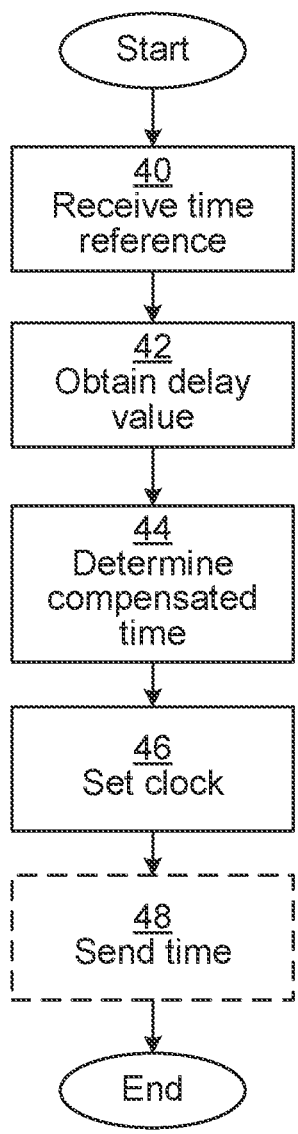
FIG. 6 is a flow chart illustrating for synchronizing time between a plurality of nodes in a converter device.

FIG. 6 is a flow chart illustrating for synchronizing time between a plurality of nodes in a converter device. The method is performed in a first node of the converter device, see, e.g., the first node 11a of FIG. 5.

In a receive time reference step 40, the first node receives a time reference from a second node. In the converter device, there is a master clock source upon which a plurality of time references in the converter device is based. In fact, all time references in the converter device can be based on the master clock source. In this way, all of these clocks will be synchronized when each node (except the source node of the master clock source) performs this method. The master clock source can, e.g., be one of the main controllers.

In an obtain delay value step 42, the first node obtains a delay value for receiving time references from the second node. The delay value can consider both a communication delay and a processing delay. The processing delay can relate to the second node, the first node or both nodes. The delay value can be, e.g., based on measuring the time of transmitting a signal to a neighbor node and receiving a response.

In a determine compensated time step 44, the first node determines a compensated time by adding the delay value to the time reference.

In a set clock step 46, the first node sets a clock in the first node to be the compensated time.

In an optional send time step 48, the first node sends the compensated time as a time reference to a third node. Optionally, there is a hop counter in the received time reference. In the time reference sent in this step, the hop counter is increased by one. Optionally, this step is only performed if the hop counter is less than a predetermined value. In this way, there is a defined end to forwarding of time references between nodes in the converter device. In one embodiment, each instance of received time reference has an identifier, in which case this step is only performed if the received time reference has not been received previously.

Optionally, the first node sends a confirmation message that the time has been set, as a response to the node from which the time reference was received. When this signal is forwarded, as described above, through the converter device for all nodes, the main controller can keep track of all the nodes having an up-to-date time setting.

By adding the delay value to the reference time in the node itself, the compensated time can form a time reference for any downstream nodes. In this way, each node will have a synchronized time, regardless of the number of hops from the original source of the reference time.

Figure 7:
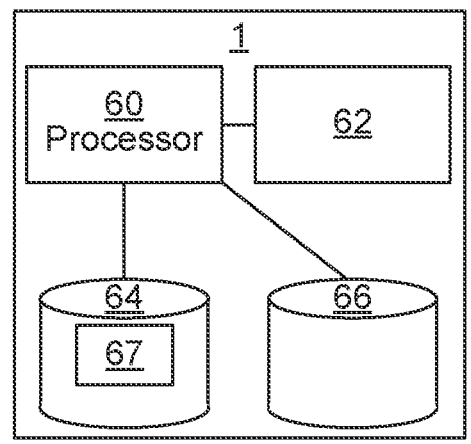
FIG. 7 is a schematic diagram illustrating components of any one of the nodes of FIG. 5 according to one embodiment.

FIG. 7 is a schematic diagram illustrating components of any one of the nodes of FIG. 5 according to one embodiment. It is to be noted that one or more of the mentioned components can be shared with other functions of the node. A processor 60 is provided using any combination of one or more of a suitable central processing unit (CPU), multiprocessor, microcontroller, digital signal processor (DSP), etc., capable of executing software instructions 67 stored in a non-transitory memory 64, which can thus be a computer program product. The processor 60 could alternatively be implemented using an application specific integrated circuit (ASIC), field programmable gate array (FPGA), etc. The processor 60 can be configured to execute the method described with reference to FIG. 6 above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The node 11 further comprises an I/O interface 62 for communicating with external and/or internal entities. Optionally, the I/O interface 62 also includes a user interface.

Other components of the node 11 are omitted in order not to obscure the concepts presented herein.

Figure 8:
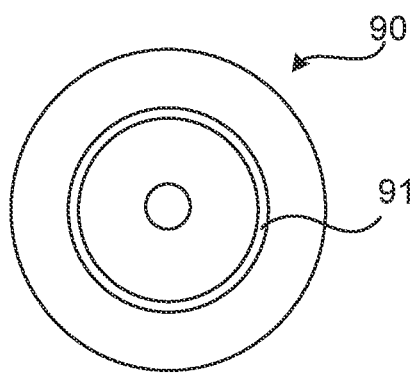
FIG. 8 shows one example of a computer program product comprising computer readable medium.

FIG. 8 shows one example of a computer program product comprising computer readable medium. On this computer readable medium, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 91 of FIG. 7. While the computer program 91 is here schematically shown as a track on the depicted optical disk, the computer program can be stored in any way which is suitable for the computer program product, such as a removable solid state memory, e.g., a Universal Serial Bus (USB) drive.

Figure 9A:
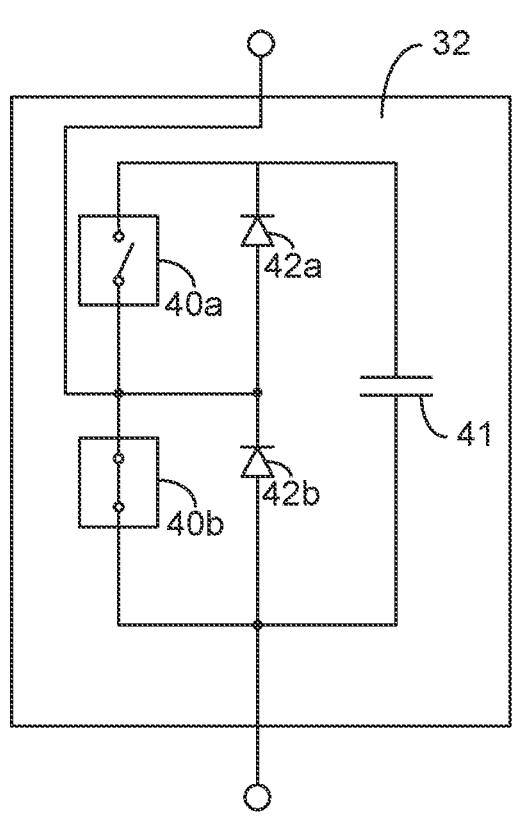
FIGS. 9A-B are schematic diagrams illustrating embodiments of switching cells of the converter cells of FIGS. 4A-B.
Figure 9B:
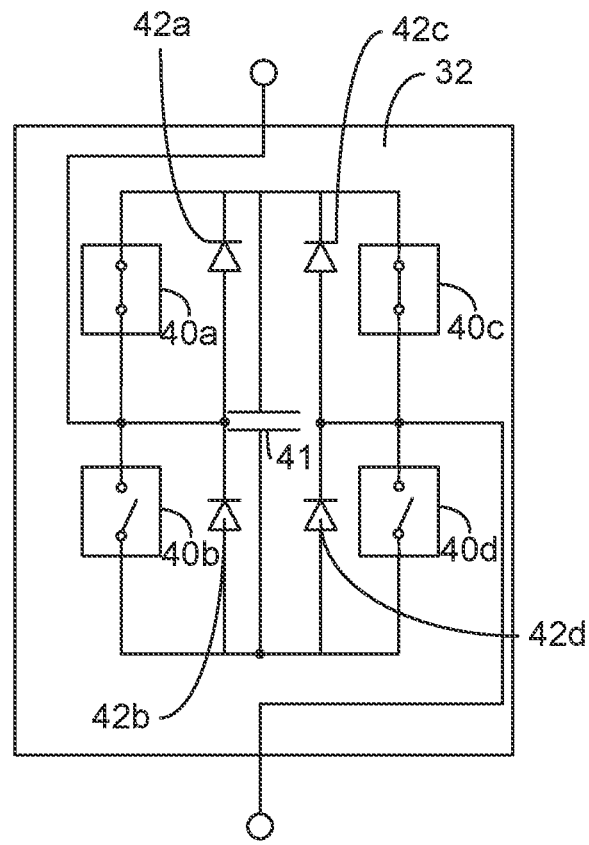

FIGS. 9A-B are schematic diagrams illustrating embodiments of switching cells 32 of the converter cells of FIGS. 4A-B. A switching cell 32 is a combination of one or more semiconductor switches, such as transistors, and one or more energy storing elements, such as capacitors, supercapacitors, inductors, batteries, etc. Optionally, a switching cell can be a multilevel converter structure such as a flying capacitor or MPC (Multi-Point-Clamped) or ANPC (Active—Neutral-Point-Clamped) multilevel structure. Optionally, a gate unit is provided for each semiconductor switch to condition an input signal to a format suitable and/or optimal for the connected semiconductor switch.

FIG. 9A illustrates a switching cell 32 implementing a half bridge structure. The switching cell 32 here comprises a leg of two serially connected active components in the form of switches 40a-b, e.g., IGBTs (Insulated-Gate Bipolar Transistors), IGCTs (Insulated Gate-Commutated Thyristors), GTOs (Gate Turn-Off thyristors), etc. A leg of two serially connected diodes 42a-b is connected with the leg of serially connected switches 40a-b as shown in the figure, in effect in parallel with the two switches 40a-b. An energy storage component 41 is also provided in parallel with the leg of transistors 40a-b and with the leg of diodes 42a-b. 32a b. The voltage synthesized by the switching cell can thus either be zero or the voltage of the energy storage component 41.

FIG. 9B illustrates a switching cell 32 implementing a full bridge structure. The switching cell 32 here comprises four switches 40a-d, e.g., IGBTs, IGCTs, GTOs, etc. An energy storage component 41 is also provided in parallel across a first leg of two transistors 40a-b and a second leg of two transistors 40c-d. Compared to the half bridge of FIG. 9A, the full bridge structure allows the synthesis of a voltage capable of assuming both signs, whereby the voltage of the switching cell can either be zero, the voltage of the energy storage component 41, or a reversed voltage of the energy storage component 41. Respective diodes 42a-d are provided in parallel with the switches 40a-d, e.g., in an anti-parallel fashion.

In FIGS. 9A-B, a switch with a parallel diode can be provided together, e.g., using a Reverse Conducting (RC) IGBT, RC-IGCT or BiGT (Bi-mode Insulated Gate Transistor).

It is to be noted that while the switching cell 32 is exemplified in FIGS. 9A-B using a half bridge cell and a full bridge switching cell, the embodiments presented herein are not limited to these examples and are applicable with any suitable configuration of a switching cell.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for synchronizing time between a plurality of nodes of a converter device for high voltage power conversion, the method being performed in a first node of the converter device and comprising:
   receiving a time reference from a second node of the converter device;
   obtaining a delay value for receiving time references from the second node;
   determining a compensated time by adding the delay value to the time reference; and
   setting a clock in the first node to be the compensated time.

2. The method according to claim 1, further comprising sending the compensated time as a time reference to a third node of the converter device.

3. The method according to claim 1, wherein the delay value considers both a communication delay and a processing delay.

4. The method according to claim 1, wherein a plurality of time references in the converter device is based on a master clock source.

5. The method according to claim 4, wherein all time references in the converter device are based on the master clock source.

6. A computer readable medium storing computer program code which, when run on the first node causes the first node to perform the method of claim 1.

7. A first node for synchronizing time between a plurality of nodes of a converter device for high voltage power conversion, the first node being one of the plurality of nodes, the first node comprising:
   a processor; and
   a non-transitory memory storing instructions that, when executed by the processor, cause the first node to:
   receive a time reference from a second node of the plurality of nodes;
   obtain a delay value for receiving time references from the second node;
   determine a compensated time by adding the delay value to the time reference; and
   set a clock in the first node to be the compensated time.

8. The first node according to claim 7, wherein the instructions further cause the first node to send the compensated time as a time reference to a third node of the plurality of nodes.

9. The first node according to claim 7, wherein the delay value considers both a communication delay and a processing delay.

10. The first node according to claim 7, wherein a plurality of time references in the converter device are based on a master clock source.

11. The first node according to claim 10, wherein all time references in the converter device are based on the master clock source.

12. A method for synchronizing time between a plurality of nodes of a converter device for high voltage power conversions:
   receiving, by a first node, a first time reference from a second node of the converter device;
   obtaining, by the first node, a first delay value for receiving time references from the second node;
   determining, by the first node, a first compensated time by adding the first delay value to the first time reference;
   setting a clock in the first node to be the first compensated time;
   sending the first compensated time as a second time reference to a third node of the converter device;
   receiving, by the third node, the second time reference from the first node of the converter device;
   obtaining, by the third node, a second delay value for receiving time references from the third node;
   determining, by the third node, a second compensated time by adding the second delay value to the second time reference;
   setting a clock in the third node to be the second compensated time; and
   sending the second compensated time as a time reference to a fourth node of the converter device.

* * * * *